(12) United States Patent
Lambert et al.

(10) Patent No.: US 10,333,362 B2
(45) Date of Patent: Jun. 25, 2019

(54) INTERNAL PERMANENT MAGNET MOTOR WITH AN OUTER ROTOR

(71) Applicant: ACCELERATED SYSTEMS INC., Waterloo (CA)

(72) Inventors: Tim Lambert, Guelph (CA); Robert Gordon Lankin, St. Agatha (CA); Stanley Baer, Kitchener (CA)

(73) Assignee: ACCELERATED SYSTMES INC., Waterloo, Ontario (CA)

( * ) Notice: Subject to any disclaimer, the term of this patent is extended or adjusted under 35 U.S.C. 154(b) by 83 days.

(21) Appl. No.: 15/512,383

(22) PCT Filed: Oct. 2, 2015

(86) PCT No.: PCT/IB2015/057560
§ 371 (c)(1),
(2) Date: Mar. 17, 2017

(87) PCT Pub. No.: WO2016/059506
PCT Pub. Date: Apr. 21, 2016

(65) Prior Publication Data
US 2017/0250584 A1    Aug. 31, 2017

Related U.S. Application Data

(60) Provisional application No. 62/064,091, filed on Oct. 15, 2014.

(51) Int. Cl.
*H02K 1/27* (2006.01)
*H02K 1/14* (2006.01)
(Continued)

(52) U.S. Cl.
CPC ............. *H02K 1/2786* (2013.01); *H02K 1/02* (2013.01); *H02K 1/146* (2013.01); *H02K 3/18* (2013.01); *H02K 21/22* (2013.01)

(58) Field of Classification Search
CPC .......... H02K 1/27; H02K 1/274; H02K 1/276; H02K 1/2766; H02K 1/277; H02K 1/2773;
(Continued)

(56) References Cited

U.S. PATENT DOCUMENTS 7,262,526 B2   8/2007  Shiga et al.
9,059,621 B2 *  6/2015  Aoyama ................. H02K 21/14
(Continued)

FOREIGN PATENT DOCUMENTS

JP    2000050585 A    2/2000
JP    2001136606 A    5/2001
(Continued)

OTHER PUBLICATIONS

International Search Report, dated Dec. 3, 2015, in PCT Application No. PCT/IB2015/057560, filed Oct. 2, 2015.

*Primary Examiner* — Tran N Nguyen
(74) *Attorney, Agent, or Firm* — Perry + Courier, Inc.

(57) ABSTRACT

Provided is an electric motor comprising: a stator comprising stator poles arranged radially and a rotor comprising rotor poles, each comprising: a substrate comprising a magnetically permeable material and at least a first magnet and a second magnet. The magnets can comprise a respective proximal end proximal to the stator and a respective distal end opposite the respective proximal end, and distal from the stator. A distance between respective proximal ends of the magnets can be equal to or greater than a distance between respective distal ends of the magnets. Each rotor pole also comprise first and second proximal cavities, each cavity extending from the respective proximal end of a magnet for a given length along about the circumferential direction and away from the proximal end of the other (Continued)

magnet. Sum of the lengths of the proximal cavities can be about equal to a width of each stator pole.

20 Claims, 9 Drawing Sheets

(51) Int. Cl.
*H02K 1/02* (2006.01)
*H02K 3/18* (2006.01)
*H02K 21/22* (2006.01)

(58) Field of Classification Search
CPC ........ H02K 1/278; H02K 1/2786; H02K 1/02; H02K 1/146; H02K 1/22; H02K 1/28; H02K 21/02; H02K 21/029; H02K 21/12; H02K 21/14; H02K 21/16; H02K 21/22
See application file for complete search history.

(56) References Cited

U.S. PATENT DOCUMENTS

| | | | |
|---|---|---|---|
| 2009/0015081 A1* | 1/2009 | Takenaka | H02K 1/2766 310/54 |
| 2009/0140593 A1 | 6/2009 | Kaiser et al. | |
| 2009/0261679 A1* | 10/2009 | Sakai | H02K 1/276 310/156.53 |
| 2012/0212095 A1 | 8/2012 | Suzuki et al. | |
| 2012/0256516 A1* | 10/2012 | Matsushita | H02K 1/2766 310/216.123 |
| 2013/0043757 A1* | 2/2013 | Kagami | H02K 1/2766 310/156.53 |
| 2013/0113326 A1* | 5/2013 | Morishita | H02K 1/274 310/156.53 |
| 2014/0077653 A1* | 3/2014 | Takahashi | H02K 1/2766 310/156.53 |
| 2015/0263573 A1* | 9/2015 | Sathyan | H02K 1/276 310/156.45 |
| 2016/0190879 A1* | 6/2016 | Zheng | H02K 1/276 310/156.53 |

FOREIGN PATENT DOCUMENTS

| | | | | |
|---|---|---|---|---|
| JP | 2001268866 A | | 9/2001 | |
| JP | 2002356190 A | | 12/2002 | |
| JP | 2003079114 A | | 3/2003 | |
| JP | 2004023976 A | | 1/2004 | |
| JP | 2004072978 A | | 3/2004 | |
| JP | 2004301038 A | | 10/2004 | |
| JP | 2007116822 A | * | 5/2007 | .......... H02K 1/2766 |
| JP | 2007215397 A | | 8/2007 | |
| JP | 2007244026 A | | 9/2007 | |
| JP | 2009136075 A | | 6/2009 | |
| JP | 2009136076 A | | 6/2009 | |
| JP | 4737193 B2 | | 5/2011 | |
| JP | 2012039775 A | * | 2/2012 | .......... H02K 1/2766 |
| KR | 20060058635 A | | 5/2006 | |
| KR | 20120009969 A | | 2/2012 | |
| WO | 03052901 A1 | | 6/2003 | |

* cited by examiner

INTERNAL PERMANENT MAGNET MOTOR WITH AN OUTER ROTOR

FIELD

The specification relates generally to electric motors, and specifically to an internal permanent magnet motor with an outer rotor.

BACKGROUND

Internal permanent magnet motors can have the highest power density of any electrical motor available today. They are used in vehicular, industrial, and commercial applications, in both the inner- and outer-rotor configurations. The outer-rotor configuration is used in vehicular applications for its reduced size and increased torque density. The same trend has dictated the design of surface-mounted permanent magnet motors for vehicular applications, but these motors do not have the extended speed range that is desired in products which are intended to provide high performance. Some compromises have been made to develop the current generation of internal permanent magnet motors which do possess this extended speed range, including a reduction in maximum torque.

Starting torque is generally proportional to a motor's size, winding fill factor, and material composition. Small size is important in vehicle applications, so large motors with high torque are still undesirable. High fill-factor motors may achieve higher torque and higher efficiency, but there is in equivalent increase in cost and manufacturing complexity. Expensive, high-performance materials are likewise prohibitive in terms of cost. The remaining frontier in motor development is material utilization and motor design.

SUMMARY

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

Provided herein is an electric motor comprising: a stator comprising a plurality of stator poles arranged radially and a rotor configured to rotate around the outside of the stator, the rotor comprising a plurality of rotor poles. Each of the plurality of rotor poles can comprise: a substrate comprising a magnetically permeable substrate material; and at least a first magnet and a second magnet, each of the first magnet and the second magnet secured in the substrate. Each of the first magnet and the second magnet can comprise a respective proximal end proximal to the stator and a respective distal end opposite the respective proximal end, and distal from the stator. A distance between respective proximal ends of the first magnet and the second magnet can be equal to or greater than a distance between respective distal ends of the first magnet and the second magnet. Each of the plurality of rotor poles also comprises a first proximal cavity in the substrate, the first proximal cavity extending from the respective proximal end of the first magnet for a first length in about a circumferential direction and away from the respective proximal end of the second magnet; and a second proximal cavity in the substrate, the second proximal cavity extending from the respective proximal end of the second magnet for a second length in about the circumferential direction and away from the respective proximal end of the first magnet. A sum of the first length and the second length can be about equal to a width of each stator pole in the circumferential direction. The first proximal cavity and the second proximal cavity can be configured to hinder leakage of magnetic flux into one or more of the plurality of stator poles from a region of the substrate joining adjacent rotor poles.

Each of the plurality of rotor poles can further comprise at least one of: a first distal cavity in the substrate, the first distal cavity extending from the respective distal end of the first magnet in about the circumferential direction and towards the respective distal end of the second magnet; and a second distal cavity in the substrate, the second distal cavity extending from the respective distal end of the second magnet in about the circumferential direction and towards the respective distal end of the first magnet.

The electric motor can further comprise a distal bridge of the magnetically permeable substrate material, the distal bridge separating the first distal cavity from the second distal cavity.

At least one of the first proximal cavity, the second proximal cavity, the first distal cavity, and the second distal cavity can contain a material having lower magnetic permeability than a magnetic permeability of the magnetically permeable substrate material.

The material can comprise air.

The rotor can further comprise a further cavity in the region of the substrate joining adjacent rotor poles.

Each of the plurality of stator poles can comprise one or more of an alloy, laminated steel, lamellar steel, powdered steel, solid steel, and composite steel.

The magnetically permeable substrate material can comprise one or more of an alloy, laminated steel, lamellar steel, powdered steel, solid steel, and composite steel.

The first magnet and the second magnet can each comprise one or more of NeFeB, SmCo, and ferrite.

Respective surfaces of the first magnet and the second magnet which face each other can comprise a same magnetic polarity.

A number of the plurality of rotor poles can be different from a number of the plurality of stator poles.

For at least one of the plurality of stator poles, a diameter of a minimum bounding circle of each cross-section of the stator pole along a plane perpendicular to the radial direction can remain constant or decrease in the radial direction towards the rotor.

The distance between the respective proximal ends of the first magnet and the second magnet can be about equal to the width of each of the plurality of stator poles in the circumferential direction.

The rotor can further comprise at least one proximal bridge of the magnetically permeable substrate material separating the first proximal cavity from its nearest proximal cavity.

The width of each stator pole in the circumferential direction can be about equal to a sum of the first length, the second length, and a respective width of the proximal bridge in the circumferential direction.

Each of the plurality of stator poles can further comprise a respective winding.

At least one of the respective windings can be machine-wound.

At least one of the first magnet and the second magnet can comprise two or more respective magnets.

A width of each of the plurality of rotor poles in the circumferential direction can be about twice the width of each of the plurality of stator poles in the circumferential direction.

A first distance between the respective proximal end and the respective distal end of the first magnet can be about equal to the width of each of the plurality of stator poles in the circumferential direction; and a second distance between the respective proximal end and the respective distal end of the second magnet can be about equal to the width of each of the plurality of stator poles in the circumferential direction.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
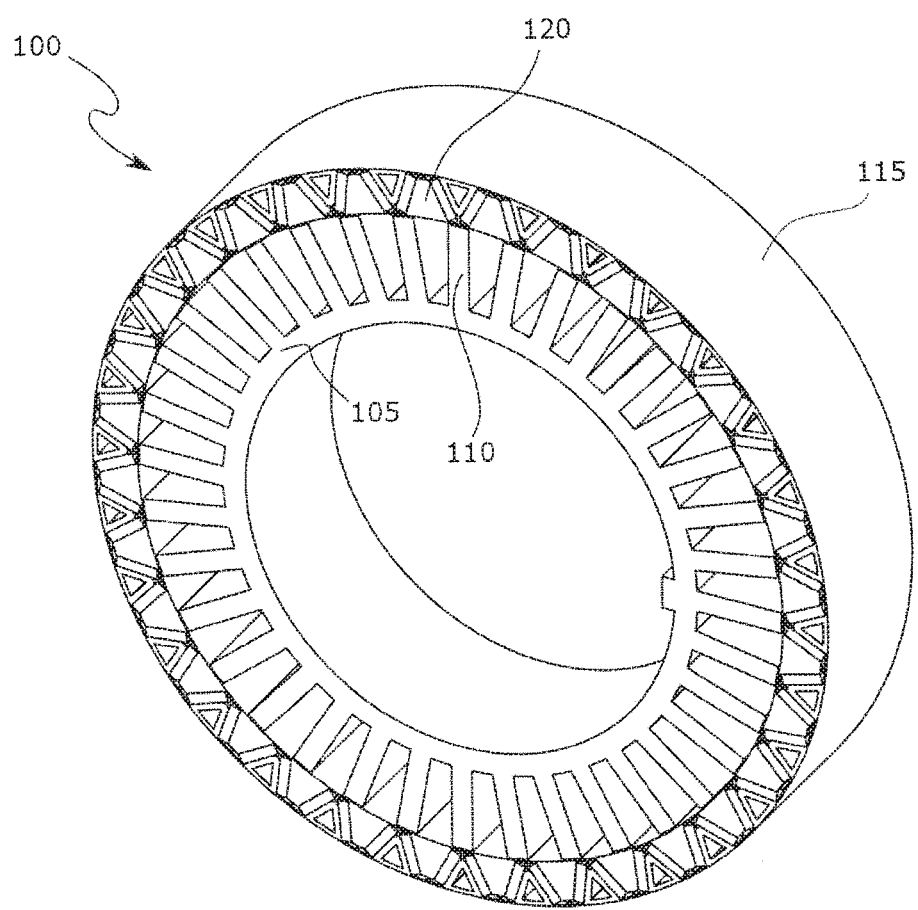
FIG. 1 depicts a perspective view of the electric motor, according to non-limiting implementations.

FIG. 1 shows in perspective a non-limiting implementation of the electric motor 100, having a stator 105 and a rotor 115 around the outside of stator 105. Stator 105 can comprise a plurality of stator poles 110 arranged radially; hereinafter, the plurality of stator poles 110 will be interchangeably referred to, collectively, as stator poles 110, and generically as a stator pole 110. Furthermore, only one stator pole 110 is numbered for clarity. Each stator pole 110 can also include a winding (not shown). Rotor 115 can comprise a plurality of rotor poles 120: hereinafter, the plurality of rotor poles 120 will be interchangeably referred to, collectively, as rotor poles 120, and generically as a rotor pole 120. Furthermore, only one rotor pole 120 is numbered for clarity. Rotor 115 can be configured to rotate around the outside of stator 105. Components of electric motor 100 other than rotor 115 and stator 105 are not shown, but otherwise assumed to be present.

Figure 2:
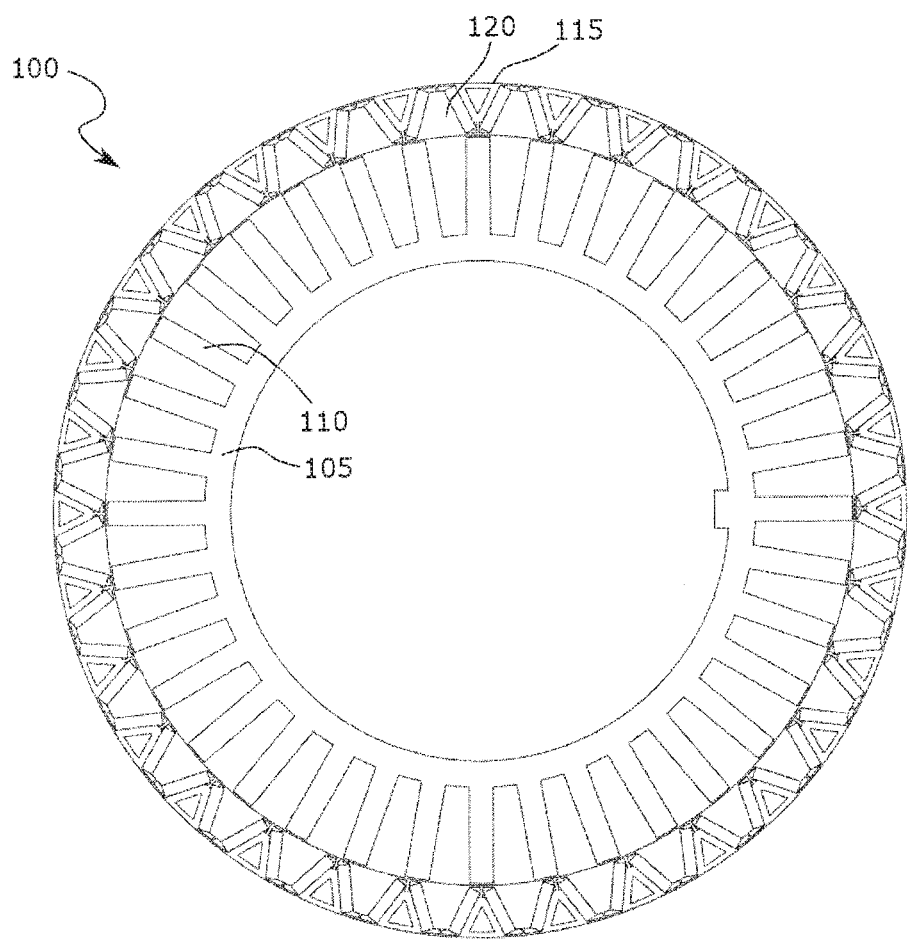
FIG. 2 depicts a cross-section in the radial plane, perpendicular to the axis of rotation, of the electric motor of FIG. 1, according to non-limiting implementations.

FIG. 2 shows a cross-section in the radial plane, perpendicular to the axis of rotation, of a non-limiting implementation of the electric motor 100. Stator 105, stator poles 110, rotor 115, and rotor poles 120 are shown. The number of stator poles 110 and rotor poles 120 can be different. Electric motor 100 shown in FIG. 2 has thirty-six (36) stator poles 110 and thirty-two (32) rotor poles 120, however in other implementations, electric motor 100 can have the same number of stator poles 110 and rotor poles 120. Some implementations of electric motor 100 can include numbers of rotor poles 120 which can be divisible by two (2), and numbers of stator poles 110 which can be divisible by two (2) and/or three (3). Such non-limiting implementations can include stators 105 with multiples of six (6), nine (9), and/or twelve (12) stator poles 110, and rotors 115 with multiples of four (4), eight (8), and/or sixteen (16) rotor poles 120. However other numbers of both stator poles 110 and rotor poles 120 are within the scope of present implementations.

Figure 3:
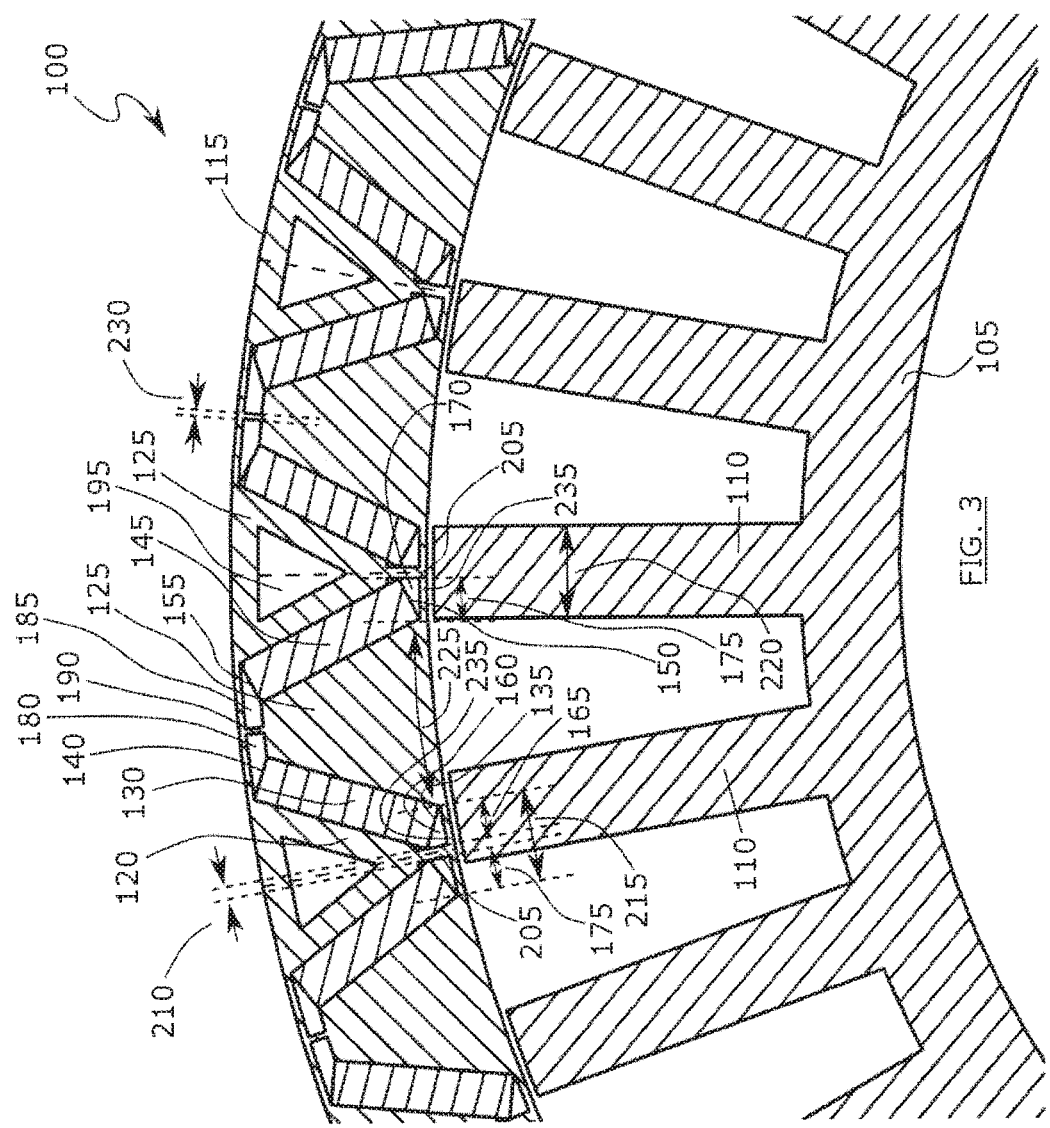
FIG. 3 depicts a detailed view of a cross-section in the radial plane, perpendicular to the axis of rotation, of a portion of the electric motor of FIG. 1, according to non-limiting implementations.

FIG. 3 shows a detailed view of a cross-section in the radial plane of a portion of electric motor 100 of the electric motor. Rotor poles 120 and stator poles 110 are shown in a position relative to each other. Each rotor pole 120 can comprise a substrate 125. Substrate 125 can comprise a magnetically permeable substrate material. Magnets 130 and 145 can be secured in substrate 125. In some implementations, magnets 130, 145 can be secured in substrate 125 by sliding magnet 130, 145 into slots (not depicted) in substrate 125. Magnet 130 can have a proximal end 135 proximal to stator 105, and a distal end 140, opposite proximal end 135, distal end 140 distal from stator 105. Similarly, magnet 145 can have a proximal end 150 proximal to stator 105, and a distal end 155, opposite proximal end 150, distal end 155 distal from stator 105.

The distance between proximal ends 135 and 150 can be greater or equal to the distance between distal ends 140 and 155. In other words, magnets 130 and 145 can be slanted towards each other so that the distance between proximal ends 135 and 150 is larger than the distance between distal ends 140 and 155, or magnets 130 and 145 can be about parallel to each other so that the distance between proximal ends 135 and 150 is about equal to the distance between distal ends 140 and 155. Proximal cavity 160 in substrate 125 can extend from proximal end 135 of magnet 130. Proximal cavity 160 can extend for length 165 in about a circumferential direction exemplified by arrow 225, and away from proximal end 150 of magnet 145. Similarly, proximal cavity 170 can extend for length 175 in about circumferential direction exemplified by arrow 225, and away from proximal end 135 of magnet 130. Shape, size, and placement of proximal cavities 160 and 170 can be the same or different from each other.

Proximal cavities 160, 170 can be configured to hinder passage of magnetic flux, and can be used as barriers to hinder leakage of magnetic flux along paths that would not optimally contribute to torque production. As such, proximal cavities 160, 170 can contain a material having a magnetic permeability lower than the magnetic permeability of the substrate material. In some implementations, proximal cavities 160, 170 can contain air. To effectively hinder the leakage of magnetic flux, proximal cavities 160, 170 can extend along substantially the full width of the rotor 115 along the axial direction, i.e. along the axis of rotation of the rotor. The precise shape and size of proximal cavities 160, 170 are not particularly limiting, however, the larger the cavities are in a given direction, the more effective a barrier they form to magnetic flux leakage in that direction. A trade-off can be that larger cavities can reduce the volume of the substrate material available for guiding and concentrating the magnetic flux of the magnets to be used for torque generation. The balance between leakage hindrance and the volume of the substrate material can be tailored for each particular implementation of electric motor 100.

In some implementations the sum of length 165 and length 175 can be about equal to the width 220 of stator pole 110 measured in the circumferential direction exemplified by arrow 225. In some implementations, the sum of lengths 165 and 175 can be within about ±20% of a width 220 of stator poles 110.

Hence, an implementation of electric motor 100 can comprise: a stator 105 comprising a plurality of stator poles 110 arranged radially; a rotor 115 configured to rotate around the outside of stator 105. Rotor 115 can comprise a plurality of rotor poles 120. Each of the plurality of rotor poles 120 can comprise: a substrate 125 comprising a magnetically permeable substrate material, at least a first magnet 130 and a second magnet 145. Each of first magnet 130 and second magnet 145 can be secured in substrate 125. Each of first magnet 130 and second magnet 145 can comprise a respective proximal end, 135, 150, proximal to stator 105 and a respective distal end, 140, 155, opposite the respective proximal end 135, 150, and distal from stator 105. A distance between respective proximal ends 135, 150 of first magnet 130 and second magnet 145 can be equal to or greater than a distance between respective distal ends 140, 155 of first magnet 130 and second magnet 145. A first proximal cavity 160 in substrate 125 can extend from the respective proximal end 135 of first magnet 130 for a first length 156 in about a circumferential direction, exemplified by arrow 225, and away from the respective proximal end 150 of second magnet 145. A second proximal cavity 170 in substrate 125 can extend from the respective proximal end 150 of second magnet 145 for a second length 175 in about the circumferential direction, exemplified by arrow 225, and away from the respective proximal end 135 of first magnet 130. A sum of first length 165 and second length 175 can be about equal to a width 220 of each stator pole in the circumferential direction. First proximal cavity 160 and second proximal cavity 170 can be configured to hinder leakage of magnetic flux into one or more of the plurality of stator poles 110 from a region of the substrate (see inter-pole region 415 in FIG. 4) joining adjacent rotor poles 120.

Some implementations can include additional distal cavities 180 and 185. Distal cavity 180 can extend from distal end 140 of magnet 130. Distal cavity 180 can extend along an about circumferential direction exemplified by arrow 225, and towards distal end 155 of magnet 145. Similarly, distal cavity 185 can extend from distal end 155 of magnet 145. Distal cavity 185 can extend along an about circumferential direction exemplified by arrow 225, and towards distal end 140 of magnet 130. In some implementations, distal cavities 180 and 185 can be separated by a distal bridge 190. Distal bridge 190 can be made of the same material as the substrate material. Distal bridge 190 can add mechanical integrity to the structure of rotor 115.

Proximal cavities 160, 170 are closer, and/or proximal, to stator 105, whereas distal cavities 180, 185 are relatively further, or distal, from stator 105. Similar to proximal cavities 160, 170, distal cavities 180, 185 can also be configured to hinder leakage of magnetic flux. In some implementations, one or more of proximal cavities 180, 185 can be filled with and/or can contain a material having a lower magnetic permeability than the magnetic permeability of the substrate material, including, but not limited to, air. To effectively hinder the passage of magnetic flux, distal cavities 180, 185 can extend along substantially the full width of rotor 115 along the axial direction. The precise shape and size of distal cavities 180, 185 are not particularly limiting. Shape, size, and placement of distal cavities 180, 185 can be the same or different from each other. Distal cavities 180, 185 can have a shape and size similar to or different from the shape and size of proximal cavities 160, 170. Distal bridge 190 can provide a relatively high magnetic permeability path, having a magnetic permeability higher than the magnet permeability of distal cavities 180, 185. A narrower distal bridge 190 having a smaller width 230 would reduce the extent of magnetic flux that can pass through distal bridge 190.

In some implementations, proximal bridges 205 separate proximal cavities 160, 170 from respective proximal cavities 160, 170 of adjoining and/or neighbouring rotor poles 120. For example, in the depicted implementation of electric motor 100, proximal bridge 205 can separate proximal cavity 160 from a proximal cavity of the adjacent rotor pole which corresponds to proximal cavity 170 and is nearest proximal cavity 160. Proximal bridges 205 can be made of the same material as the substrate material. Proximal bridges 205 can enhance the mechanical integrity of rotor 115. Proximal bridges can have a width 210 measured in the circumferential direction exemplified by arrow 225. In some implementations, the combined length 215 of lengths 165, 175, and width 210 can be about equal to width 220 of stator poles 110. In some implementations, the combined length 215 of lengths 165, 175, and width 210 can be within about ±20% of the width 220 of stator poles 110. Proximal bridges 205 can provide a relatively high magnetic permeability path, compared to the relatively lower magnetic permeability of proximal cavities 160, 170. Narrower proximal bridges 205 having a smaller width 210 would reduce the extent of magnetic flux that can pass through proximal bridges 205.

Rotor 115 can be made of a plurality of substantially identical adjacent rotor poles 120. Rotor 115 can have further cavities 195 in the region of the magnetically permeable substrate 125 joining adjacent rotor poles 120. Cavities 195 can contain a material of lower density than the density of substrate 125, and cavities 195 can reduce the weight of rotor 115. Rotor 115 can have two or more cavities 195, so long as cavities 195 do not interfere with the balance of rotor 115 during rotation. The shape and size of cavities 195 is not particularly limiting. However, there can be a trade-off between reducing weight of rotor 115 by having larger cavities 195, and a concomitant loss in the volume of the substrate available for guiding and concentrating the magnetic flux to generate torque. The balance between weight reduction and optimal substrate volume can be tailored for each particular motor implementation.

In some implementations, the distance between proximal end 135 and proximal end 150, i.e. the distance marked by arrow 225, can be about equal to width 220 of stator pole 110. In some implementations, the distance between proximal end 135 and proximal end 150, i.e. the distance marked by arrow 225, can be within about ±20% of twice the width 220 of stator pole 110. In FIG. 3, width 220 is marked along stator pole 110 at a distance away from the tip of stator pole 110 closest to rotor 115, because stator pole 110 is shown to have a constant width along its radial length. Width 220 is intended to provide a measure of the width of stator pole 110 at the tip of stator pole 110 closest to rotor 115. In implementations where width 220 of stator pole 110 is not constant along its length, width 220 is generally measured at the tip of stator pole 110 closest to rotor 115.

In some implementations, a width of rotor pole 120 measured in the circumferential direction exemplified by arrow 225, can be about twice the width 220 of stator pole 110. In some implementations, a width of rotor pole 120 measured in the circumferential direction exemplified by arrow 225, can be within about ±20% of twice the width 220 of stator pole 110. Width of rotor pole 120 can be about equal to the sum of combined length 215 and the length indicated by arrow 225. Width of rotor pole 120 in the circumferential direction can be within about ±20% of the sum of combined length 215 and the length of arrow 225.

In some implementations, length of first magnet 130, measured as the distance between proximal end 135 and distal end 140, and length of second magnet 145, measured as the distance between proximal end 150 and distal end 155, can be about equal to the width 220 of stator pole 110. In some implementations, lengths of first magnet 130 and second magnet 145 can be within about ±50% of width 220 of stator pole 110. First magnet 130 and second magnet 145 can have lengths that are the same or different. In some implementations, each of first magnet 130 and second magnet 145 can comprise two or more magnets respectively.

In some stator pole designs (not shown in FIG. 3, but see FIG. 8), a portion of the stator pole nearer the rotor can be generally wider, along a plane perpendicular to the radial direction, than another portion of the stator pole further from the rotor. In such designs, the windings around each stator pole often need to be manually wound. Some implementations of the present stator poles can have such a design. In other implementations, any portion of the stator pole 110 nearer rotor 115 can be generally the same or narrower along a plane perpendicular to the radial direction, than another portion of the same stator pole 110 further from rotor 115. In other words, the diameter of the minimum bounding circle of each cross-section of the stator pole 110 along a plane perpendicular to the radial direction can remain constant or decrease in the radial direction towards rotor 115. It is appreciated that a minimum bounding circle is the smallest circle that completely contains a shape; in this case the shape is the cross-sectional shape of each stator pole 110, the cross-section taken along a plane perpendicular to the radial direction. At each point along the radial length of each stator pole 110, such a cross-section is taken, and the minimum bounding circle of each cross-section determined, for example in a design phase of electric motor 100. The diameter of these minimum bounding circles can remain constant or decrease along the radial length of each stator pole 110 in the direction of rotor 115. This latter design can allow for a cylindrical or conical winding to slide over stator pole 110. Such a cylindrical or conical winding can be machine-wound, which would obviate the need for manual winding of stator poles 110.

In some implementations, the portions 235 of substrate 125 between proximal ends 135, 150 and stator 105 can be removed or replaced with a material with lower magnetic permeability than the magnetic permeability of the substrate material (implementation not shown in Figures). In these implementations, removing or replacing portions 235 can further hinder leakage of magnetic flux from portions 235 into stator poles 110.

Figure 4:
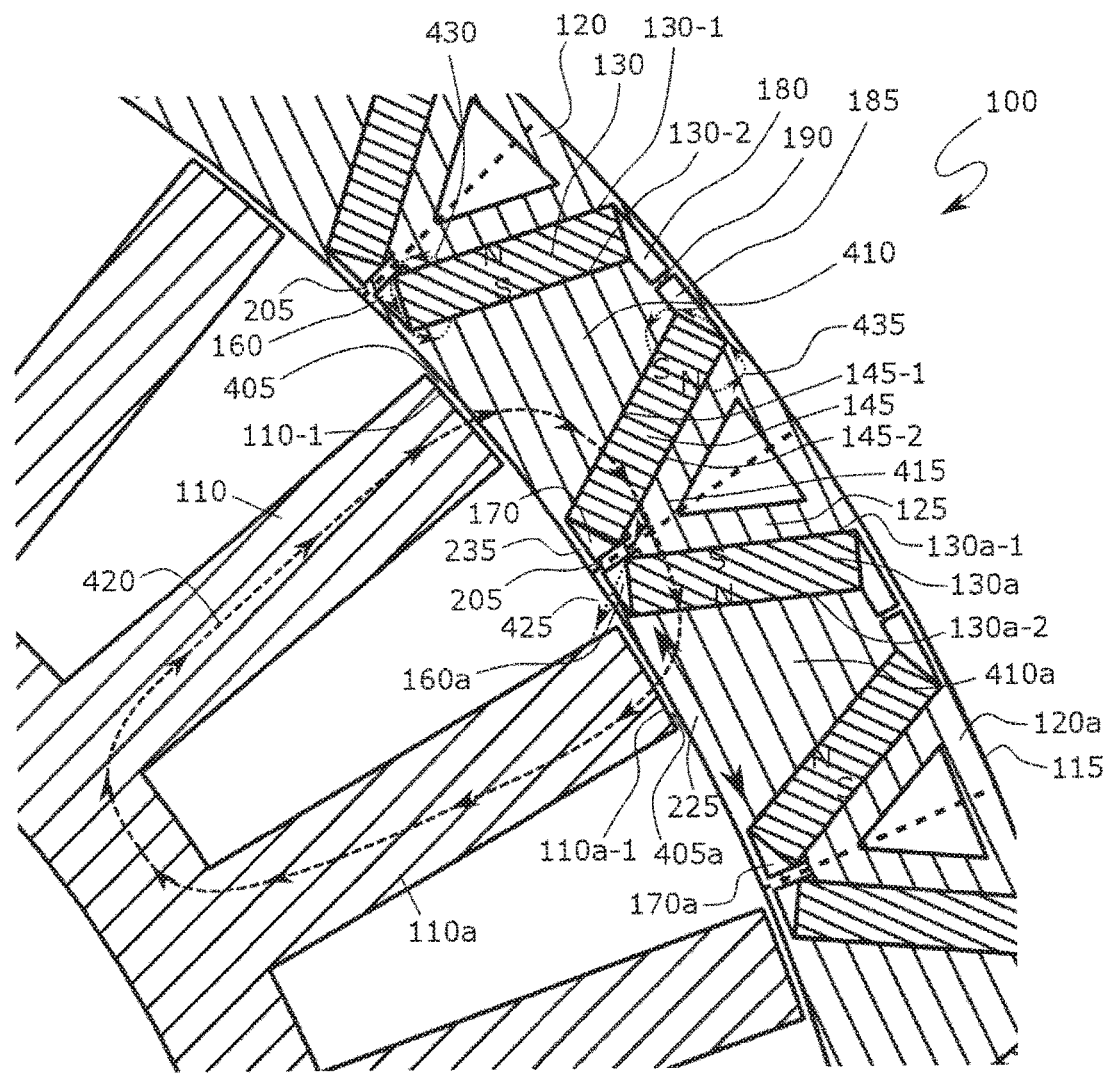
FIG. 4 depicts a detailed view of a cross-section in the radial plane, perpendicular to the axis of rotation, of a portion of the electric motor of FIG. 1 and example magnetic flux paths, according to non-limiting implementations.
Figure 5:
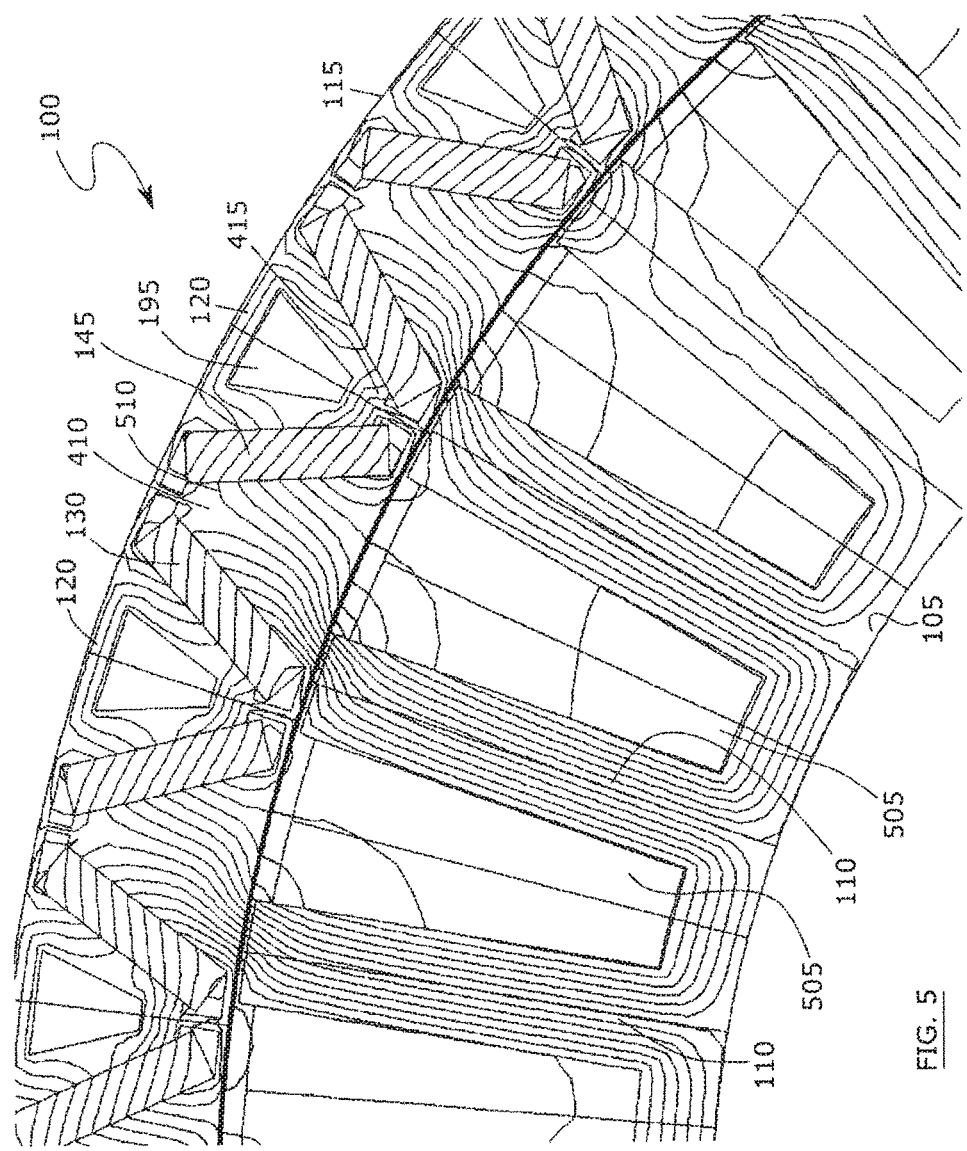
FIG. 5 depicts a detailed view of a cross-section in the radial plane, perpendicular to the axis of rotation, of a portion of the electric motor of FIG. 1 and example magnetic flux paths, according to non-limiting implementations.
Figure 6:
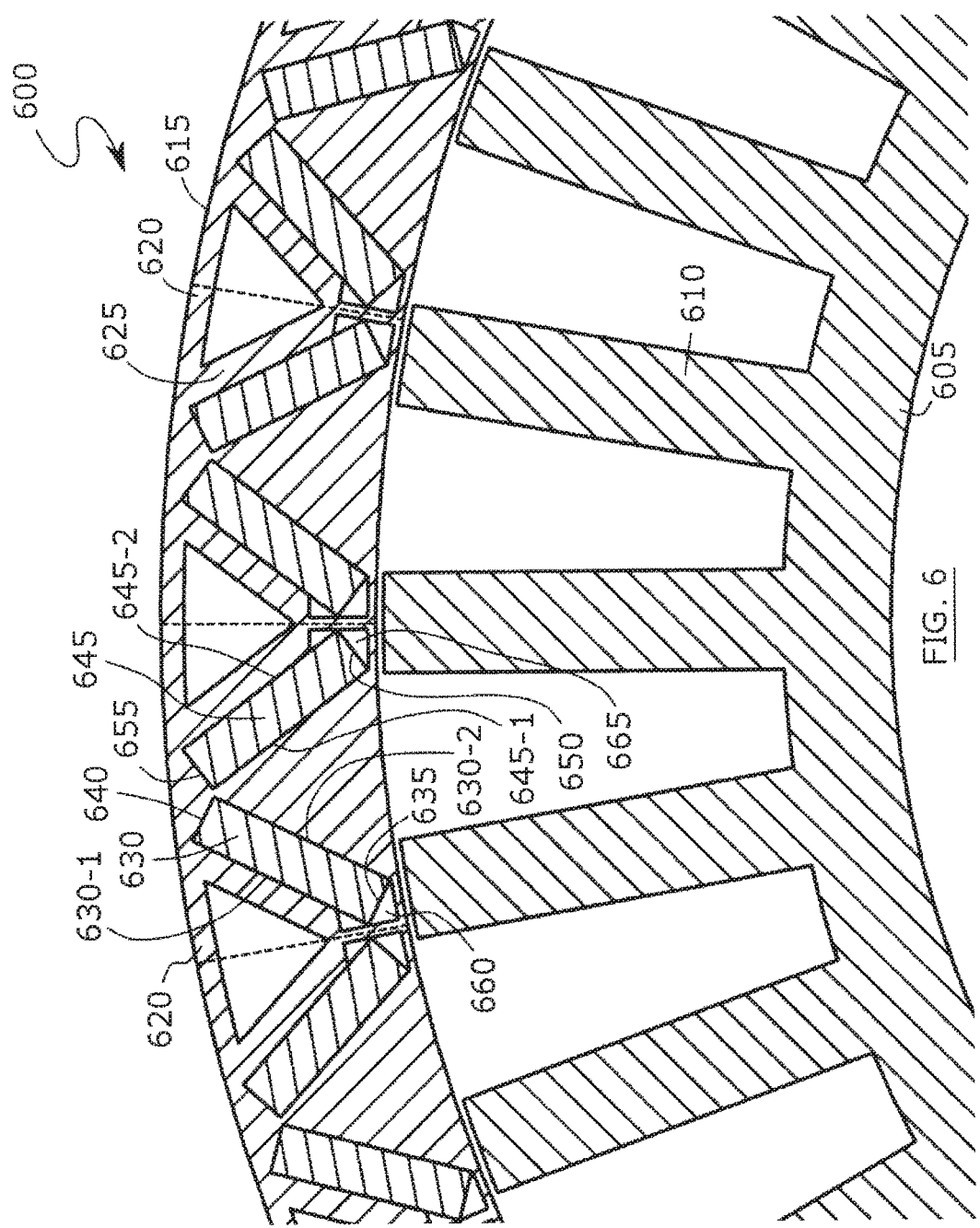
FIG. 6 depicts a detailed view of a cross-section in the radial plane, perpendicular to the axis of rotation, of a portion of an electric motor without distal cavities in the rotor, according to non-limiting implementations.
Figure 9:
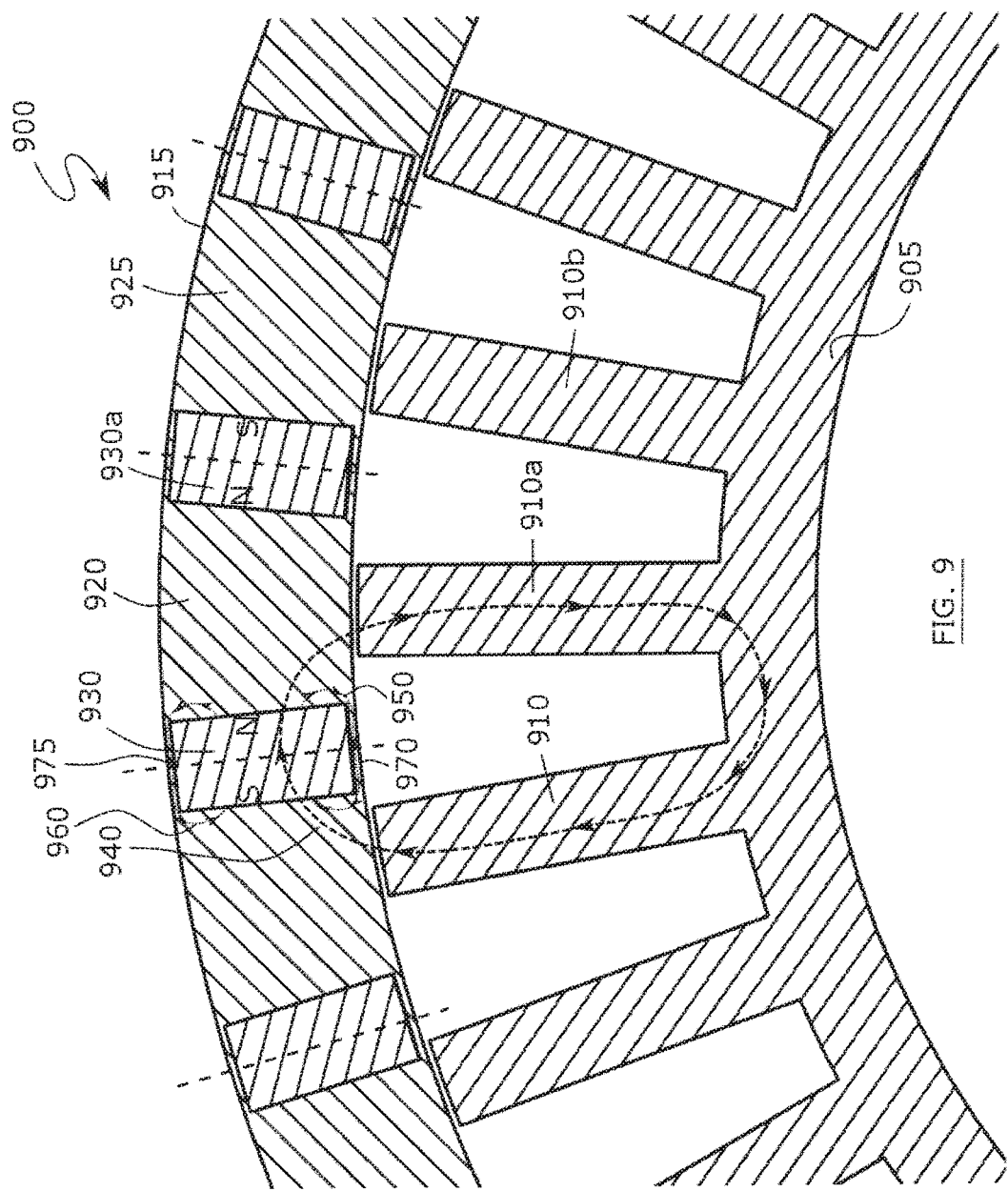
FIG. 9 depicts a detailed view of a cross-section in the radial plane, perpendicular to the axis of rotation, of a portion of an electric motor without cavities in the rotor, according to non-limiting implementations.

In FIG. 3, radially extending dashed lines demarcate each rotor pole 120, from its neighbouring rotor pole. These dashed lines run through the middle of cavity 195 and proximal bridge 205. These dashed lines are for descriptive purposes only, and do not represent any physical feature in rotor 115. Similar dashed lines, used only for descriptive purposes, are shown in FIGS. 4, 6, and 9. FIG. 5 shows radial solid lines passing through the middle of cavities 195 to demarcate neighbouring rotor poles 120. Similar to the dashed lines in FIGS. 3, 4, 6, and 9, these straight lines are for descriptive purposes only, and do not represent any physical feature in rotor 115.

Stator poles 110 can comprise materials including but not limited to laminated steel, lamellar steel, powdered steel, solid steel, and/or composite steel, and/or another alloy. Magnets 130, 145 can comprise materials including but not limited to NeFeB, SmCo, or ferrite. Magnet 130 and magnet 145 can comprise the same material or different materials. Magnet 130 and magnet 145 can also comprise alloy, composite, or laminate materials. The substrate material can comprise materials including but not limited to laminated steel, lamellar steel, powdered steel, solid steel, and/or composite steel, and/or another alloy.

FIG. 4 shows a close-up of a cross-section in the radial plane of a portion of electric motor 100. FIG. 4 shows adjacent rotor poles 120 and 120a within rotor 115, and adjacent stator poles 110 and 110a. Magnets 130, 145 can be magnetized so that magnetization of surface 130-2 of magnet 130 is the same as magnetization of surface 145-1 of magnet 145. Surfaces 130-2 and 145-1 are shown to have "south" magnetizations. In other implementations, surfaces 130-2 and 145-1 can have "north" magnetizations.

Surfaces 130-1 and 145-2 can each have magnetizations opposite those of 130-2 and 145-1 respectively. In general, magnetization of magnet surfaces 130-1, 130-2, 145-1, 145-2, 130a-1, 130a-2, 145a-1, and 145a-2 can be as shown in FIG. 4, or the opposite of the magnetization shown in FIG. 4. Magnetization of the stator poles 110 and 110a can be time-variable and determined by direction of current passing through windings around stator poles 110 and 110a (windings not shown). Generally, the change over time in the magnetization of stator poles drives the rotation of motor 100.

Magnetic flux path 420, shown as a dashed line, represents a sample magnetic flux path that can contribute to generating torque in motor 100. Magnetic flux along flux path 420 exits surface 110-1, and crosses gap 405 into flux concentration area 410 of rotor pole 120. The flux then enters surface 145-1 of magnet 145, and passes through surface 145-2 into inter-pole region 415. Magnetic flux then enters surface 130a-1 of magnet 130a, and then passes through surface 130a-2 into flux concentration area 410a of adjacent rotor pole 120a. The flux then crosses gap 405a into surface 110a-1 of stator pole 110a.

Flux concentration areas 410, 410a and the inter-pole region 415 can be made of a magnetically permeable material, which can be the same as or different from the substrate material. When the magnetic flux is in the inter-pole region 415, flux path 425 tending to pass from inter-pole region 415 into surface 110a-1 of stator pole 110a, is hindered by one or both of proximal cavities 170, 160a. Flux path 425 can be hindered because it is not an optimal magnetic flux path for generating torque in motor 100.

Proximal cavities 170, 160*a* can contain material with lower magnetic permeability than the magnetic permeability of the substrate material and the inter-pole region 415 and flux concentration areas 410, 410*a*. As such, magnetic flux tends to travel through areas of relatively higher magnetic permeability and avoid areas of relatively lower magnetic permeability, such as proximal cavities 170, 160*a*. The larger the difference between the magnetic permeabilities of the high and low magnetic permeability regions, the more effectively the magnetic flux can be channeled within the higher magnetic permeability areas and hindered from passing and/or leaking across lower magnetic permeability areas.

However, proximal bridge 205 can comprise a relatively high magnetic permeability material such as the substrate material. As such, proximal bridge 205 can provide a path for magnetic flux to leak from inter-pole region 415 into surface 110*a*-1 of stator pole 110*a*. Because of this leakage, minimizing the width 210 (marked in FIG. 3) of proximal bridge 205 can reduce magnetic flux leakage from inter-pole region 415 into stator pole 110*a*.

Given the direction of magnetization of magnets 130 and 145, a portion of the magnetic flux can have a tendency to loop from one surface of a magnet to the opposite surface of the same magnet, as shown in sample magnetic flux paths 430 and 435. These flux paths do not contribute to generating torque. Proximal cavity 160 can hinder flux along path 430 from looping from surface 130-1 back onto surface 130-2. In this case also, proximal bridge 205 can provide a path for magnetic flux to leak from surface 130-1 to surface 130-2. Minimizing the width 210 (marked in FIG. 3) of proximal bridge 205 can reduce magnetic flux leakage from surface 130-1 to surface 130-2.

Similarly, distal cavity 185 can hinder magnetic flux path 435 from looping from surface 145-2 back to surface 145-1. Distal bridge 190 can provide a path for magnetic flux to leak from surface 145-2 to surface 145-1. Minimizing width 230 (marked in FIG. 3) of distal bridge 190 can reduce magnetic flux leakage from surface 145-2 to surface 145-1.

Generally, proximal and distal cavities 160, 170, 180, and 185, and the corresponding cavities of other rotor poles tend to hinder magnetic flux from looping from one surface of each magnet back onto the opposite surface of the same magnet. This tends to concentrate magnetic flux in flux concentration areas 410, 410*a*, whence the flux can pass to and from stator poles 110 and 110*a*, and can be used to generate torque for motor 100.

Some magnetic flux can also leak from flux concentration area 410, along portion 235 of the substrate, into stator pole 110*a*. Reducing dimensions and/or the magnetic permeability of portion 235 can reduce this leakage. In some implementations, portion 235 can be removed, and replaced by the same material as the material occupying gaps 405 and 405*a*. In some implementations this material can be air.

The orientation of the magnets and the placement of the cavities can allow for magnetic flux from both surfaces of each magnet to be concentrated and used to generate torque for electric motor 100. So long as magnets 130, 145 are at an angle to the circumferential direction exemplified by arrow 225, at least some of the magnetic flux from both of their surfaces bearing the "north" and "south" magnetic poles can be used to generate torque. Magnets 130, 145 can be at any angle to each other in the range of about 0 degrees to about 150 degrees. To optimize magnetic flux concentration and torque generation using magnetic flux from both surfaces of each magnet, the angle between magnets 130 and 145 can be in the range of about 0 degrees to about 90 degrees.

Distal cavities 180 and 185 can be of any shape, size, and placement, so long as they can hinder the magnetic flux from looping from one surface of a magnet to the opposite surface of the same magnet, for example along path 435. Proximal cavities 160, 170, 160*a*, and 170*a* can also be of any shape, size, and placement so long as 1) they can hinder the magnetic flux from looping from one surface of a magnet to the opposite surface of the same magnet, for example along path 430, and 2) two adjacent proximal cavities, for example proximal cavities 170 and 160*a*, can hinder the magnetic flux from leaking from inter-pole region 415 into stator pole 110*a*. In some implementations, in order to hinder magnetic flux from leaking from inter-pole region 415 into stator poles 110, 110*a*, the combined length 215 of lengths 165, 175 of proximal cavities 160, 170 and width 210 of proximal bridge 205 can be about equal to, or within about ±20% of, width 220 of stator poles 110 and 110*a* (lengths and widths marked in FIG. 3).

FIG. 5 shows a detailed view of a cross-section in the radial plane of a portion of electric motor 100, along with magnetic flux lines produced using magnetic modelling software. FIG. 5 shows the stator 105, stator poles 110, rotor 115, and rotor poles 120. Windings 505 of stator pole 110 are also shown. Lines 510 show an example distribution of the magnetic flux. As FIG. 5 shows, the magnetic flux density tends to be relatively higher in components made of materials with relatively higher magnetic permeability, such as stator poles 110, magnets 130, 145, flux concentration area 410, and inter-pole region 415. Regions made of relatively lower magnetic permeability, such as cavity 195, tend to have relatively lower magnetic flux density. For a given implementation of the electric motor, the exact magnetic flux distribution can vary over time as the magnetization of stator poles 110 is changed and as rotor 115 rotates around stator 105.

FIG. 6 shows a detailed view of a cross-section in the radial plane of a portion of a non-limiting implementation of an electric motor 600. Electric motor 600 is similar to electric motor 100 in that electric motor 600 has a stator 605, stator poles 610, rotor 615, and rotor poles 620. Each stator pole 610 can also include a winding (not shown). Each rotor pole 620 can have a first magnet 630 having a proximal end 635 and a distal end 640 and a second magnet 645 having a proximal end 650 and a distal end 655. Proximal cavity 660 can extend from proximal end 635 and proximal cavity 665 can extend from proximal end 650.

The implementation of the electric motor 600 depicted in FIG. 6, however, has no cavities extending from distal ends 640, 655. In the depicted implementation, distal ends 640 and 655 can be closer together than distal ends 140 and 155 in electric motor 100. The proximity of distal ends 640 and 655 can allow distal end 640 to hinder some of the magnetic flux from looping between surfaces 630-1 and 630-2 over distal end 640. Similarly, proximity of distal ends 640 and 655 can allow distal end 655 to hinder some of the magnetic flux from looping between surfaces 645-1 and 645-2 over distal end 655. The closer distal end 640 is to distal end 655, the larger the portion of the magnetic flux that is hindered from looping between opposite surfaces of the same magnet over the distal end of each magnet. The more the looping between opposite surfaces of the same magnet is hindered, the stronger will be the magnetic flux concentration in substrate 625 in the area between surfaces 630-2 and 645-1.

Figure 7:
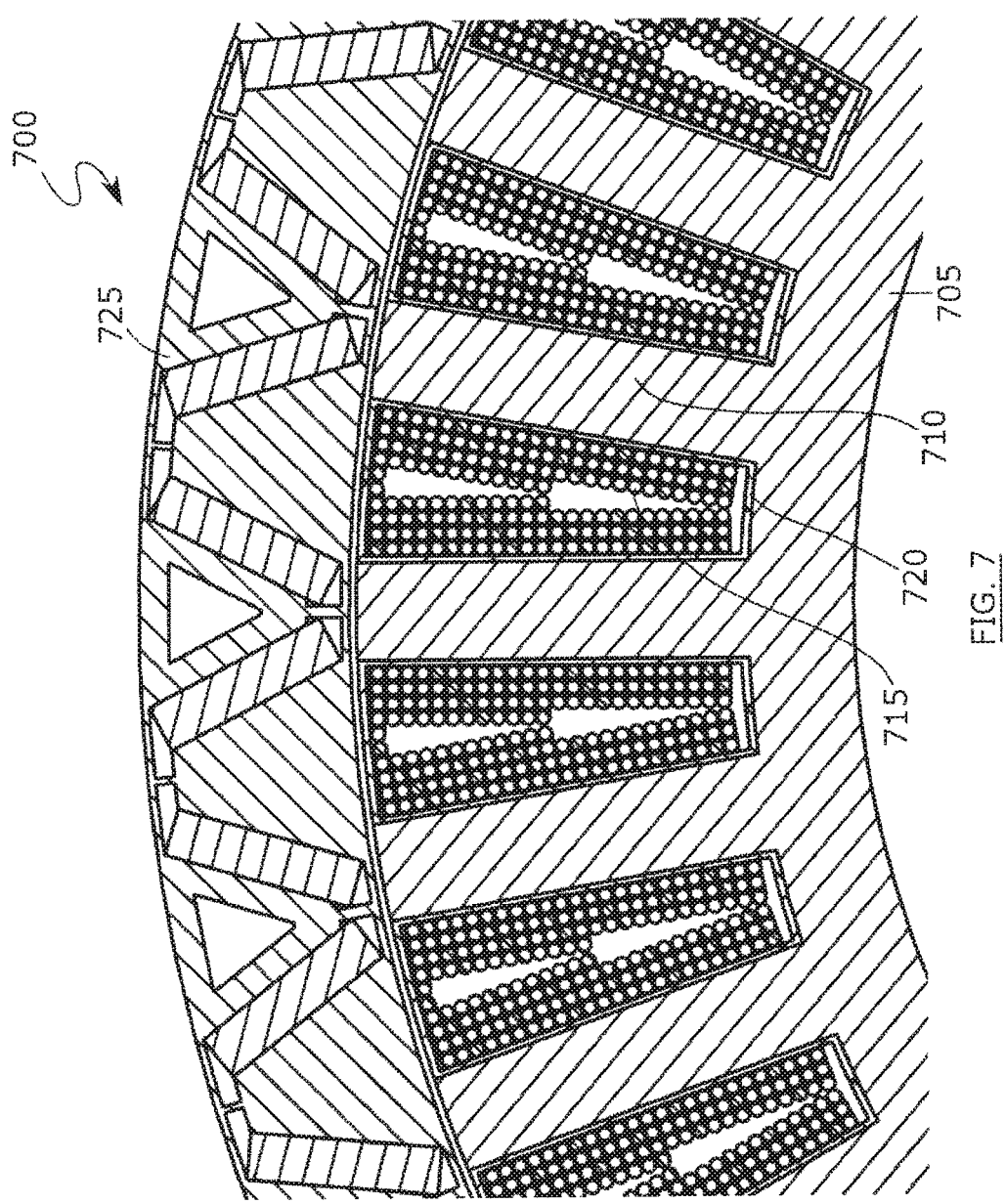
FIG. 7 depicts a detailed view of a cross-section in the radial plane, perpendicular to the axis of rotation, of a portion of an electric motor including stator windings, according to non-limiting implementations.

FIG. 7 shows a detailed view of a cross-section in the radial plane of a portion of a non-limiting implementation of an electric motor 700 that is similar to electric motor 100. Similar to electric motor 100, electric motor 700 comprises a stator 705 having stator poles 710, and a rotor 725. However, unlike the depiction of electric motor 100 in FIG. 1, FIG. 7 shows that each stator pole 710 can be surrounded by a winding 715. Winding 715 can be wound around a bobbin 720, which can be slid onto stator pole 710. Bobbin 720 can be manually wound or machine wound. FIG. 7 shows winding 715 comprising a different number of layers at different radial distances along stator pole 710. For example, winding 715 is shown as having five layers closes to rotor 725, and three layers furthest from rotor 725. In other implementations, winding 715 can have a constant number of layers along the radial length of stator pole 710.

Figure 8:
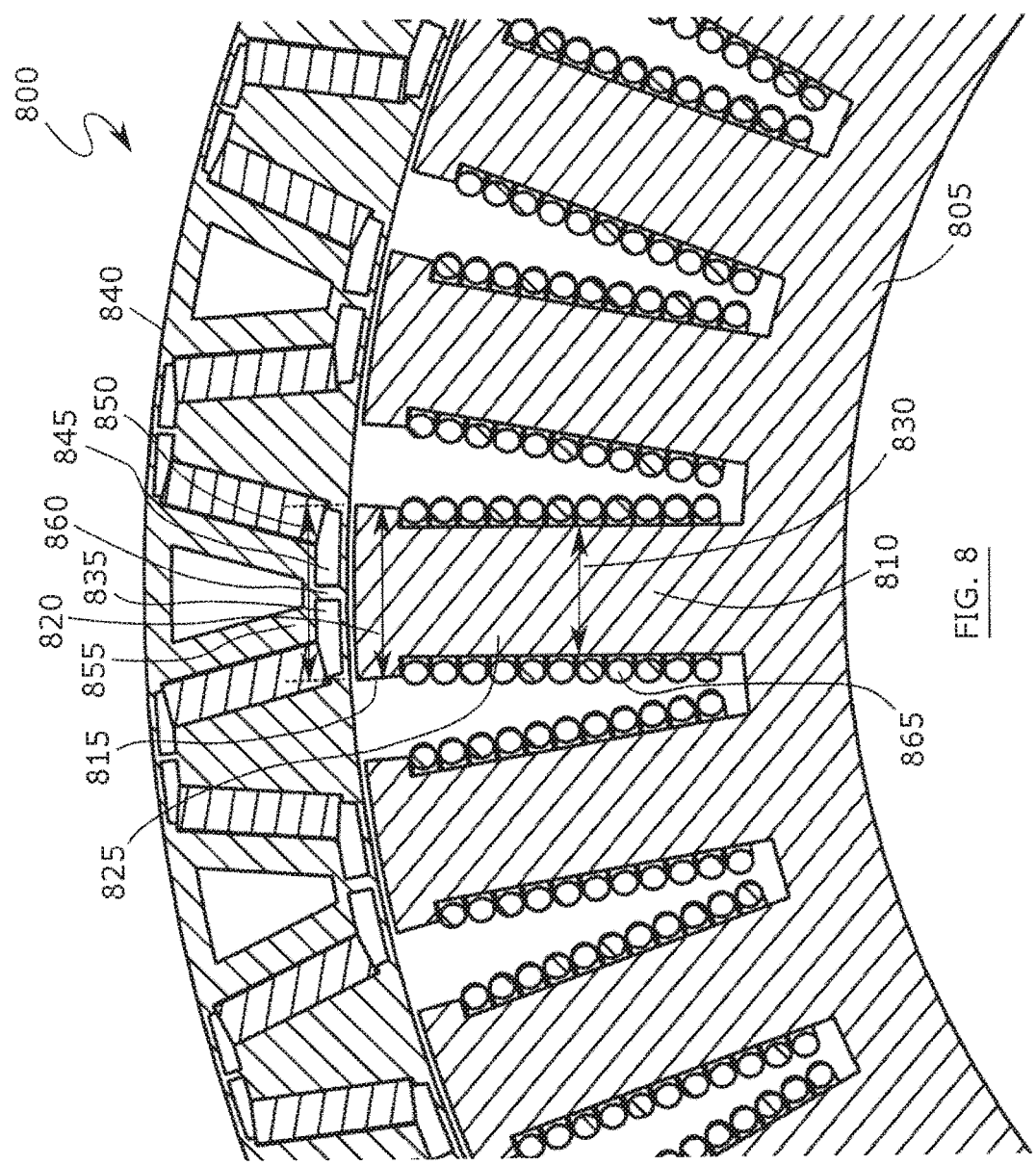
FIG. 8 depicts a detailed view of a cross-section in the radial plane, perpendicular to the axis of rotation, of a portion of an electric motor including stator windings, according to non-limiting implementations.

FIG. 8 shows a detailed view of a cross-section in the radial plane of a portion of a non-limiting implementation of an electric motor 800 that is similar to electric motor 100. Similar to electric motor 100, electric motor 800 comprises a stator 805 having stator poles 810, and rotor 840. However, unlike electric motor 100, in electric motor 800 tip 815 of stator pole 810 can have a larger width 820 in the circumferential direction than width 830 of the stem 825 of stator pole 810. In this implementation, windings 865 cannot be easily slid onto stator pole 810. Windings 865 can generally be manually wound around stator 810. In this implementation, width 820 can be available for magnetic interaction with rotor 840. To effectively prevent magnetic flux leakage from the inter-pole region 855 into stator pole 810, length 850 can be within about ±20% of width 820. Length 850 can be the sum of lengths of proximal cavities 835, 845 and width of proximal bridge 860 in the circumferential direction.

As depicted, a shape of proximal cavities 835, 845 is different than the shape of proximal cavities 160, 170 of electric motor 100 (shown in FIG. 3). Proximal cavities 835, 845 and proximal cavities 160, 170 represent two examples of possible shapes for proximal cavities. In some implementations electric motor 100 can have proximal cavities 160, 170 shaped similar to proximal cavities 835, 845. Similarly, in some implementations electric motor 800 can have proximal cavities 835, 845 shaped similar to proximal cavities 160, 170.

FIG. 9 shows a detailed view of a cross-section in the radial plane of a portion of a non-limiting implementation of an electric motor 900. Similar to electric motor 100, electric motor 900 comprises a stator 905 comprising stator poles 910, 910a, 910b, and rotor 915 comprising a plurality of rotor poles 920, 925. However, unlike electric motor 100, in electric motor 900, magnets 930, 930a have no cavities extending from their ends. Each stator pole 910, 910a, 910b can also include a winding (not shown). Magnets 930, 930a can be disposed along the radial direction. In this implementation, the thickness of magnets 930, 930a along the circumferential direction can be about equal to the thickness of stator poles 910, 910a, 910b along the circumferential direction. In some implementations, the thickness of magnets 930, 930a along the circumferential direction can be within about ±20% of the thickness of stator poles 910, 910a, 910b along the circumferential direction. In some implementations, the thickness of magnets 930, 930a along the circumferential direction can be within about ±150% of the thickness of stator poles 910, 910a, 910b along the circumferential direction.

As shown in FIG. 9, in some implementations stator poles 910, 910a, 910b can have a constant width along the entirety of their radial length. In these implementations, each stator pole 910, 910a, 910b can further comprise a bobbin (not shown), similar to bobbin 720 shown in FIG. 7. Such a bobbin can be manually-wound and/or machine-wound. The stator poles 910, 910a, 910b can also have a width that is variable along their radial length; for example, stator poles 910, 910a, 910b can have a design similar to stator poles 810, shown in FIG. 8.

The implementation of motor 900 depicted in FIG. 9 can permit flux to flow along flux path 940, and/or in another similar path, that includes two or more of stator poles 910, 910a, 910b, and at least one of magnets 930, 930a. Flux path 940 is an example of a flux path that can contribute to generating torque in electric motor 900.

Magnets 930, 930a can be magnetized so that their respective surfaces that face each other can have the same magnetization. As depicted in the non-limiting example shown in FIG. 9, facing surfaces of magnets 930, 930a are shown as having "north" magnetization (as indicated by "N"), and the surfaces of magnets 930, 930a opposite the north-magnetized surfaces have a "south" magnetization (as indicated by "S"). In some embodiments, respective magnetizations of each magnet 930, 930a can be reversed. Given the magnetization of magnets 930, 930a, some of the magnetic flux can have a tendency to loop between the north magnetized surface and the south magnetized surface of the same magnet along portions 970, 975 of rotor 915. Flux paths 950, 960 are examples of such flux paths looping between north- and south-magnetized surfaces of magnet 930. Such flux paths do not contribute to torque generation. Narrowing portions 970, 975 in the radial direction can reduce the magnetic flux that can loop between the north- and south-magnetized surfaces of magnet 930. This, in turn, can further concentrate the magnetic flux in the portion of rotor pole 920 that is between magnets 930, 930a. The concentrated magnetic flux can be used to generate torque in electric motor 900.

In addition, narrowing portion 970 of rotor 915 in the radial direction can reduce the magnetic flux that can leak out along portion 970 from the flux concentration portion of rotor pole 920, situated between magnets 930, 930a. This can also increase the magnetic flux available to generate torque.

The invention claimed is:

1. An electric motor comprising:
   a stator comprising a plurality of stator poles arranged radially;
   a rotor configured to rotate around the outside of the stator, the rotor comprising a plurality of rotor poles, each of the plurality of rotor poles comprising:
   a substrate comprising a magnetically permeable substrate material,
   at least a first magnet and a second magnet, each of the first magnet and the second magnet secured in the substrate,
   each of the first magnet and the second magnet comprising a respective proximal end proximal to the stator and a respective distal end opposite the respective proximal end, and distal from the stator,
   a distance between respective proximal ends of the first magnet and the second magnet being equal to or greater than a distance between respective distal ends of the first magnet and the second magnet,
   a first proximal cavity in the substrate, the first proximal cavity extending from the respective proximal end of the first magnet for a first length in about a circumferential direction and away from the respective proximal end of the second magnet; and a second proximal cavity in the substrate, the second proximal cavity extending from the respective proximal end of the second magnet for a second length in about the circumferential direction and away from the respective proximal end of the first magnet;

a sum of the first length and the second length being about equal to a width of each stator pole in the circumferential direction, the first proximal cavity and the second proximal cavity configured to hinder leakage of magnetic flux into one or more of the plurality of stator poles from a region of the substrate joining adjacent rotor poles.

2. The electric motor of claim 1, wherein each of the plurality of rotor poles further comprises at least one of:

a first distal cavity in the substrate, the first distal cavity extending from the respective distal end of the first magnet in about the circumferential direction and towards the respective distal end of the second magnet; and a second distal cavity in the substrate, the second distal cavity extending from the respective distal end of the second magnet in about the circumferential direction and towards the respective distal end of the first magnet.

3. The electric motor of claim 2, further comprising a distal bridge of the magnetically permeable substrate material, the distal bridge separating the first distal cavity from the second distal cavity.

4. The electric motor of claim 2, wherein at least one of the first proximal cavity, the second proximal cavity, the first distal cavity, and the second distal cavity contains a material having lower magnetic permeability than a magnetic permeability of the magnetically permeable substrate material.

5. The electric motor of claim 4, wherein the material comprises air.

6. The electric motor of claim 1, wherein the rotor further comprises a further cavity in the region of the substrate joining adjacent rotor poles.

7. The electric motor of claim 1, wherein each of the plurality of stator poles comprises one or more of an alloy, laminated steel, lamellar steel, powdered steel, solid steel, and composite steel.

8. The electric motor of claim 1, wherein the magnetically permeable substrate material comprises one or more of an alloy, laminated steel, lamellar steel, powdered steel, solid steel, and composite steel.

9. The electric motor of claim 1, wherein the first magnet and the second magnet each comprises one or more of NeFeB, SmCo, and ferrite.

10. The electric motor of claim 1, wherein respective surfaces of the first magnet and the second magnet which face each other comprise a same magnetic polarity.

11. The electric motor of claim 1, wherein a number of the plurality of rotor poles is different from a number of the plurality of stator poles.

12. The electric motor of claim 1, wherein for at least one of the plurality of stator poles, a diameter of a minimum bounding circle of each cross-section of the stator pole along a plane perpendicular to the radial direction remains constant or decreases in a radial direction towards the rotor.

13. The electric motor of claim 1, wherein the distance between the respective proximal ends of the first magnet and the second magnet is about equal to the width of each of the plurality of stator poles in the circumferential direction.

14. The electric motor of claim 1, wherein the rotor further comprises at least one proximal bridge of the magnetically permeable substrate material separating the first proximal cavity from its nearest proximal cavity.

15. The electric motor of claim 14, wherein the width of each stator pole in the circumferential direction is about equal to a sum of the first length, the second length, and a respective width of the proximal bridge in the circumferential direction.

16. The electric motor of claim 1, wherein each of the plurality of stator poles further comprises a respective winding.

17. The electric motor of claim 16, wherein at least one of the respective windings is machine-wound.

18. The electric motor of claim 1, wherein at least one of the first magnet and the second magnet comprises two or more respective magnets.

19. The electric motor of claim 1, wherein a width of each of the plurality of rotor poles in the circumferential direction is about twice the width of each of the plurality of stator poles in the circumferential direction.

20. The electric motor of claim 1, wherein a first distance between the respective proximal end and the respective distal end of the first magnet is about equal to the width of each of the plurality of stator poles in the circumferential direction; and a second distance between the respective proximal end and the respective distal end of the second magnet is about equal to the width of each of the plurality of stator poles in the circumferential direction.

\* \* \* \* \*